US010586301B2

(12) United States Patent
Kazama et al.

(10) Patent No.: US 10,586,301 B2
(45) Date of Patent: Mar. 10, 2020

(54) AUTOMATIC PARKING MANAGEMENT SYSTEM AND AUTOMATIC PARKING MANAGEMENT METHOD

(71) Applicant: Hitachi, Ltd., Chiyoda-ku, Tokyo (JP)

(72) Inventors: Yoriko Kazama, Tokyo (JP); Yoshikazu Tsuda, Tokyo (JP); Ryuichi Kitayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 15/632,003

(22) Filed: Jun. 23, 2017

(65) Prior Publication Data

US 2018/0005338 A1  Jan. 4, 2018

(30) Foreign Application Priority Data

Jun. 30, 2016  (JP) ................................. 2016-131066

(51) Int. Cl.
*G06Q 50/30* (2012.01)
*G05D 1/02* (2020.01)
(Continued)

(52) U.S. Cl.
CPC ............. *G06Q 50/30* (2013.01); *B60W 30/06* (2013.01); *G05D 1/0212* (2013.01); *G06Q 10/02* (2013.01); *G06Q 30/0284* (2013.01)

(58) Field of Classification Search
CPC .... G06Q 50/30; G06Q 30/0284; G06Q 10/02; G05D 1/0212; B60W 30/06
(Continued)

(56) References Cited

U.S. PATENT DOCUMENTS

2010/0017347 A1\*  1/2010  Hagemann ........... B65D 19/004
                                                           705/400
2017/0178268 A1\*  6/2017  Ishikawa ................ G06Q 50/30
(Continued)

FOREIGN PATENT DOCUMENTS

JP          11-296796 A      10/1999
JP        2002-299412 A      10/2002
(Continued)

OTHER PUBLICATIONS

Serpen, Gursel; Dou, Chao; "Automated robotic parking systems: real-time, concurrent and multi-robot path planning in dynamic environments"; 2014 (Year: 2014).\*
(Continued)

*Primary Examiner* — Rupangini Singh
*Assistant Examiner* — Dione N. Simpson
(74) *Attorney, Agent, or Firm* — Crowell & Moring LLP

(57) ABSTRACT

An operation method is proposed to retain parking man-hours and reducing a cost by means of an automatic parking management system using carriers to transport a vehicle. The automatic parking management system, managing parking of vehicles, includes: a simulator that simulates a status of vehicles from boarding and drop-off areas to inside a parking place; and a resource management subsystem that manages a quantity of vehicle carriers; wherein a number of times of use of the parking place is predicted based on usage history of the parking place and the optimum quantity of vehicle carriers to satisfy aimed work efficiency can be calculated by inputting the predicted number of times of use and using the simulator. Additionally, a time of using the parking place for each user is predicted based on the user's parking place usage history, and a movement instruction to change a position of the vehicle within the parking place is issued in accordance with the prediction result.

3 Claims, 12 Drawing Sheets

(51) Int. Cl.
   B60W 30/06 (2006.01)
   G06Q 30/02 (2012.01)
   B62D 15/02 (2006.01)
   G08G 1/14 (2006.01)
   G06Q 10/02 (2012.01)
(58) Field of Classification Search
   USPC .......................................................... 705/5
   See application file for complete search history.

(56) References Cited

U.S. PATENT DOCUMENTS

| | | | | |
|---|---|---|---|---|
| 2017/0212511 | A1* | 7/2017 | Paiva Ferreira | G08G 1/143 |
| 2017/0226764 | A1* | 8/2017 | Nussbaum | E04H 6/18 |

FOREIGN PATENT DOCUMENTS

| | | | | |
|---|---|---|---|---|
| JP | 2004-60194 | A | | 2/2004 |
| JP | 2004-318599 | A | | 11/2004 |
| JP | 2009-245221 | A | | 10/2009 |
| JP | 5007262 | | * | 8/2012 |
| JP | 5007262 | B2 | * | 8/2012 |
| JP | 2014164530 | | * | 2/2013 |
| JP | 2014164530 | A | * | 9/2014 |
| JP | 2015-219811 | A | | 12/2015 |
| JP | 2017194968 | | * | 10/2017 |
| JP | 2017194968 | A | * | 10/2017 ............. G07B 15/02 |

OTHER PUBLICATIONS

Peter Svensson Associated PRess "Robots hit the spot Automated garages squeeze more cars into parking spaces: [Home Edition]" (Year: 2007).*

Japanese-language Office Action issued in counterpart Japanese Application No. 2016-131066 dated Sep. 24, 2019 with English translation (seven pages).

* cited by examiner

| | 401 | 402 | 403 | 404 | 405 | 406 | 407 | 408 |
|---|---|---|---|---|---|---|---|---|
| | ID | Length | Height | Type | Vehicle Type | Number | Color | Owner |
| | 1 | 2.5 | 1.2 | RV | Company T XX | I 11-11 | Black | A |
| | 2 | 2.3 | 1.3 | Van | Company H YY | A 00-00 | Red | B |
| | | | | | | | | |
| | | | | | | | | |

FIG.8

| | 701 | 702 | 703 | 704 | 705 | 706 | 707 | 708 |
|---|---|---|---|---|---|---|---|---|
| | ID | Position (Latitude and Longitude) | Parking Place Size | Average Number of Parked Vehicles | Maximum Number of Parked Vehicles | Number of Carriers | Parking Use Prediction for Next Day | Work Efficiency |
| | A | (35°41'22", 139°41'30") | 20km² | 1000 | 1500 | 50 | 500 | 0.8 |
| | B | (35°41'50", 139°41'44") | 5km² | 100 | 150 | 8 | 150 | 0.5 |
| | C | (35°42'00", 139°41'00") | 7km² | 300 | 600 | 25 | 400 | 0.6 |
| | D | (35°41'77", 139°42'00") | 10km² | 500 | 900 | 35 | 510 | 0.7 |

| User ID 1301 | Age 1302 | Sex 1303 |
|---|---|---|
| 1 | 30's | Female |
| 2 | 40's | Male |
| ... | | |
| | | |

FIG.15

| 1401 | 1402 | 1403 | 1404 | 1405 | 1406 |
|---|---|---|---|---|---|
| User ID | Number | Past Visit Date | Arrival Time | Departure Time | Purchase History |
| 1 | I 11-11 | 2016/04/01 | 9:00 | 15:00 | A |
| 2 | A 00-00 | 2016/04/02 | 11:00 | 13:00 | B |
| ... | | | | | |
| | | | | | |

2

AUTOMATIC PARKING MANAGEMENT SYSTEM AND AUTOMATIC PARKING MANAGEMENT METHOD

TECHNICAL FIELD

The present invention relates to an automatic parking management system and automatic parking management method. Particularly, the invention relates to an automatic parking management system and automatic parking management method for use at a large-scale parking place built on a premise of a large-scale facility such as a large-scale commercial facility or a large-scale amusement facility.

BACKGROUND ART

Conventionally, a parking management system is designed so that vehicles are loaded to, and unloaded from, a parking place by means of, for example, automatic driving or autonomous driving to park the vehicles in an empty parking space, and unload the vehicles from the respective parking spaces. For example, a conventional vehicle control system moves a vehicle from a parking space to an unloading wait position in the parking place by means of automatic driving, and arranges them in line, and makes them wait in a wait order depending on a preset reserved unloading time. In such conventional vehicle control system, when a passenger arrives at a boarding position of the parking place, the relevant vehicle is moved to an empty parking space by means of automatic driving; and even if the reserved unloading time is changed, the vehicle is evacuated from the wait position according to the changed scheduled unloading time (Refer to Japanese Patent Application Laid-Open Publication No. 2015-219811.).

Such service to automatically move a vehicle from a drop-off position to an empty parking space of the parking place by means of such automatic driving or using a carrier and then move the vehicle from the parking space at the parking place to the boarding position according to a scheduled unloading time reduces time required for the passenger as a user to search for an empty space to park the vehicle and also reduces their stress caused by the work to park the vehicle in the empty parking space, while it is also possible to secure safety by preventing minor collisions between vehicles as well as between a vehicle and a person in the parking place. Such service to move a vehicle, from which the passenger has gotten off, manually or automatically by using a carrier or by means of automatic driving is called "valet parking."

SUMMARY OF THE INVENTION

Problems to be Solved by the Invention

However, when conducting the valet parking using carriers, there are situations where, for example, a vehicle cannot be moved to the boarding position at the scheduled unloading time or waiting time to unload a target vehicle increases due to, for example, insufficient quantity of carriers or congestion inside the parking place. Therefore, when such situations arise, there is fear that this may result in degradation of the quality of the service and convenience of the valet parking cannot be obtained sufficiently.

Thus, an entity managing the parking place may increase the quantity of carriers to provide passengers with a high quality service, however, if the quantity of carriers is increased, an initial cost may well become expensive and, therefore, there is a problem of a trade-off between the service and its cost. Meanwhile, a utilization rate of the parking place changes in accordance with, for example, a day of a week, time or season, and it is difficult to prepare an appropriate quantity of carriers depending on such fluctuating utilization rate in a timely manner.

The present invention was devised in consideration of the above-described circumstances, and aims at proposing an automatic parking management system and automatic parking management method capable of efficiently performing parking work using an optimum quantity of carriers calculated in accordance with each parking space at a parking place.

Means to Solve the Problems

In order to solve the above-described problems, one aspect of the present invention is characterised in an automatic parking management system for parking a vehicle in any empty parking space of a plurality of parking spaces at a parking place by a carrier, wherein the automatic parking management system includes: at least one carrier capable of retaining a newly-arrived vehicle and transporting the vehicle to the empty parking space; a carrier control unit that controls movement of the carrier within the parking place; a simulation unit that guides a virtual carrier to the empty parking space in a simulated manner before having the carrier control unit actually move the carrier; and a parking efficiency calculation unit that calculates a required quantity of carriers and man-hours at the parking place based on a result of the simulated guidance by the simulation unit.

Another aspect of the present invention is characterised in an automatic parking management method using a computer to control parking of a vehicle in any empty parking space of a plurality of parking spaces at a parking place by a carrier, wherein the automatic parking management method includes: a carrier control step executed by the computer using at least one carrier to retain a newly-arrived vehicle, and moving the vehicle to the empty parking space within the parking place; a simulation step executed by the computer guiding a virtual carrier to the empty parking space in a simulated manner before actually moving the carrier in the carrier control step; and a parking efficiency calculation step executed by the computer calculating a required quantity of carriers and man-hours at the parking place based on a result of the simulated guidance in the simulation step.

Advantageous Effects of the Invention

According to the present invention, the parking work can be performed efficiently using the optimum quantity of carriers calculated in accordance with each parking space at the parking place.

BRIEF DESCRIPTION OF DRAWINGS

FIG. 8 is an example of parking place information data for managing a plurality of parking places.

FIG. 15 is a diagram illustrating an example of a user history information table.

DESCRIPTION OF EMBODIMENTS

An embodiment of the present invention will be described below in detail with reference to the drawings.

(1) First Embodiment (1-1) An Example of Status of Performing Automatic Parking Management An outline of assumed valet parking will be explained below using FIGS. 1 and 2, while a system for calculating the quantity of vehicle carriers for valet parking will be explained using FIGS. 4, 5 and 6.

Figure 1:
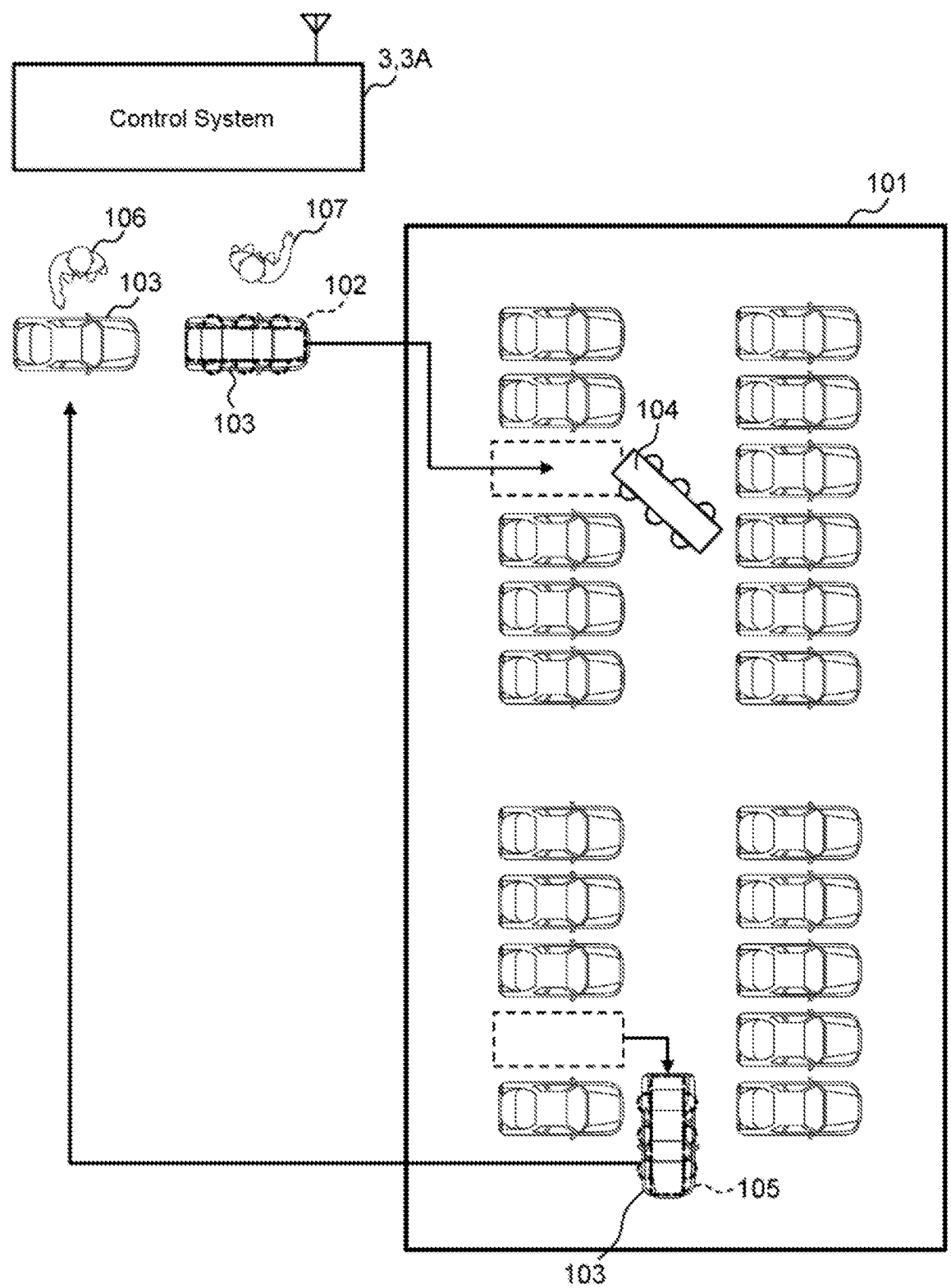
FIG. 1 is a plan view illustrating a schematic configuration example of an automatic parking management system according to the present embodiment.

FIG. 1 illustrates an outline configuration example of an automatic parking management system according to the present embodiment. This automatic parking management system parks a vehicle 103 in any empty parking space of a plurality of parking spaces at a parking place, by carriers 102, 104 and 105. In an example illustrated in the drawing, a service called "valet parking" is provided. This valet parking is a service to automatically move a vehicle, from which a passenger 106 got off (the vehicle 103 is illustrated as an example), to a parking space at the parking place using, for example, the carriers 102, 104 and 105.

This automatic parking management system is configured so that the vehicle 103 driven by the passenger 106 is transported to a parking space 101 by the carrier 102, 104 and 105. In the example illustrated in the drawing, three carriers 102, 104 and 105 are shown, however the number of the carriers 102, 104 and 105 is not limited to three. Each of these carriers 102, 104 and 105 is equipped with a radio communication unit (not illustrated in the drawing) that wirelessly communicates with a control system 3.

A plurality of vehicles 103 can be parked in the parking space 101 and each vehicle 103 is moved from a drop-off space designated in advance to the inside of the parking space 101 by means of the carriers 102 and 104.

When a passenger 107 gets off from the vehicle 103 in the drop-off space, the control system 3 detects that the passenger 107 got off (or input of such action, and the control system 3 wirelessly transmits, as triggered by this detection, a transportation instruction to, for example, the carrier 102 which is not performing transportation work from among the carriers 102, 104 and 105. Note that the carriers 104, 105 have the same configuration and function as those of the carrier 102, therefore the carrier 102 will mainly be exemplified and explained in the present embodiment.

The carrier 102 has an elevating mechanism for mechanically retaining, lifting up and down the vehicle 103 in response to the transportation instruction. The carrier 102 moves in accordance with the instruction from the control system 3 using this elevating mechanism, and parks the vehicle 103 in a specified parking space designated in accordance with this instruction. A movement route of the carrier 102 to the designated specific parking position is determined by the control system 3. Note that the same is applicable to the carriers 104 and 105 as mentioned above.

When determining the movement route of the carrier 102, 104 and 105 and the parking space for the vehicle 103, the control system 3 uses the size of the target vehicle 103 as input information. By inputting the size of the vehicle 103, parking work efficiency can be enhanced by arranging the vehicles 103 having various sizes in an optimum parking manner, using a limited planar (or spatial) parking space in the parking place.

Meanwhile, for example, when the passenger 106 who has completed their errand gives an unloading instruction to the control system 3, the control system 3 wirelessly informs a carrier, which is not performing work to transport any vehicle (for example, the carrier 105) of the plurality of carriers 102, 104 and 105, of a transportation instruction to transport a vehicle designated by the passenger 106. This transportation instruction includes vehicle information such as a position and size of the vehicle 103 which is the target to be transported, a parking position of a transportation source, and a movement route up to that parking position. The carrier 105 transports the target vehicle to the boarding position in accordance with the transportation instruction.

Figure 2A:
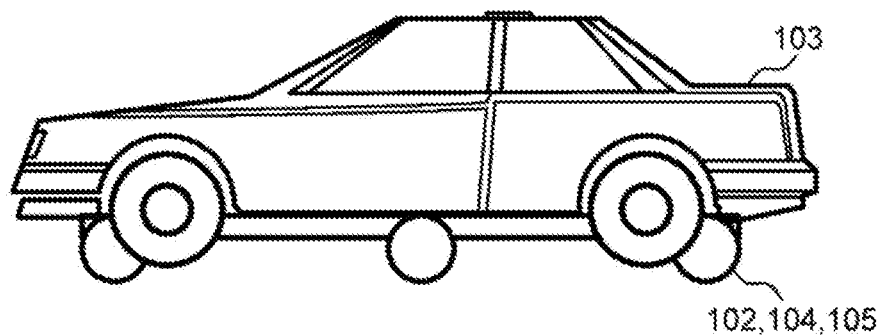
FIGS. 2A and 2B are side and top views illustrating an example of a state where a vehicle indicated in FIG. 1 is mounted on a carrier.
Figure 2B:
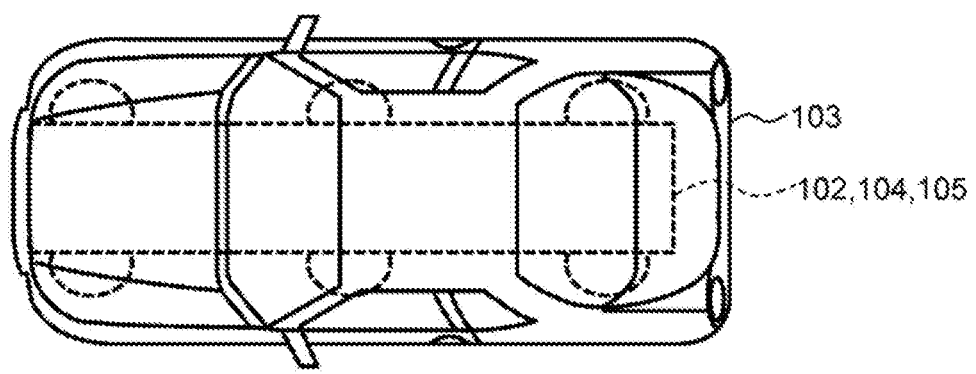

FIG. 2 illustrates an example of a state where the vehicle 103 targeted to be transported is made to enter a transportable state by mounting the vehicle 103 on the carrier 102, 104 and 105. This vehicle 103 is transported in a state temporarily retained by a lock mechanism capable of attaching the vehicle to, or detaching the vehicle from, any one of the carriers 102, 104 and 105. Each of the carriers 102, 104 and 105 is configured so that it can enter underneath the vehicle 103 which is the target to be transported.

Note that the configuration of the carrier 102, 104 and 105 is not limited to the configuration that enables the entire body of the carrier 102, 104 and 105 to enter the space beneath the bottom of the vehicle 103 which is the target to be transported, and the configuration of the carrier 102, 104 and 105 may be designed so that part of the carrier 102, 104 and 105 enters the space beneath the bottom of the vehicle 103. These carriers 102, 104 and 105 are respectively equipped with an elevating mechanism for further lifting the vehicle 103 in a state of retaining the vehicle 103 in accordance with a manipulation by a manipulation unit not illustrated in the drawing.

(1-2) Configuration Example of Control System

Figure 3:
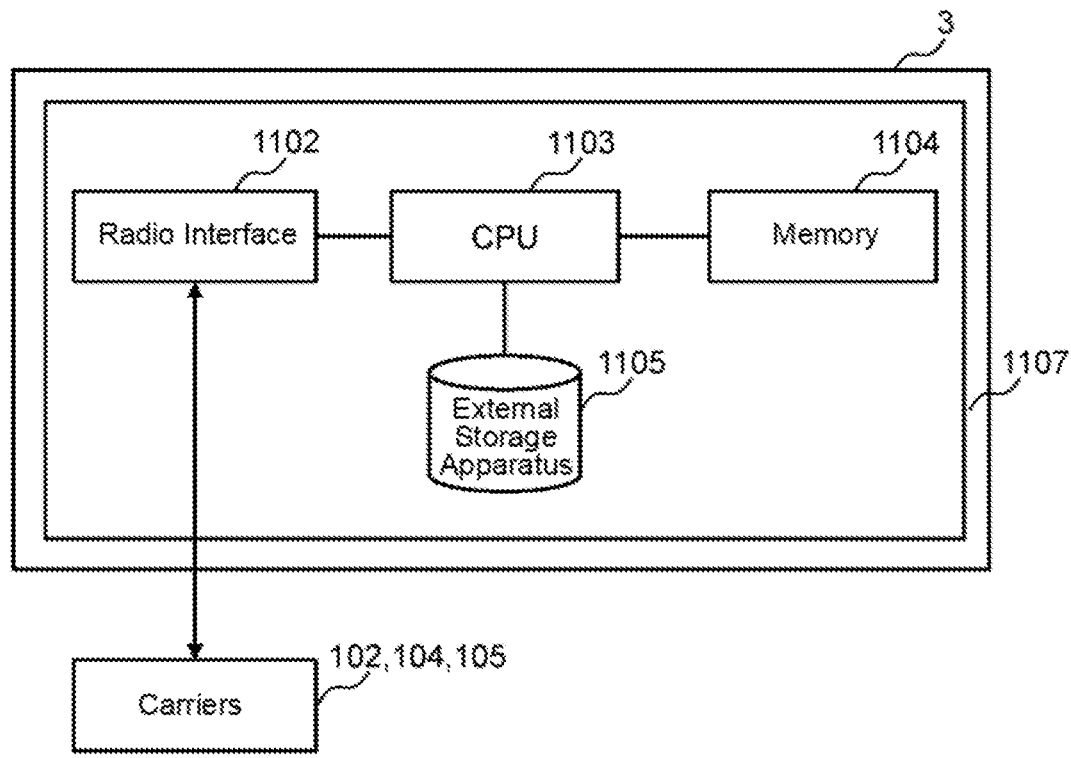
FIG. 3 is a block diagram illustrating a hardware configuration example of a control system according to a first embodiment.

FIG. 3 illustrates a configuration example of the control system 3 indicated in FIG. 1. The control system 3 includes a control server 1107. This control server 1107 includes a radio interface 1102, a CPU (Central Processing Unit) 1103, a memory 1104, and an external storage apparatus 1105.

The control server 1107 is, for example, a computer such as an open system server or a mainframe computer. The radio interface 1102 wirelessly and mutually communicates with the carriers 102, 104 and 105.

The external storage apparatus 1105 is, for example, at least either one of an HDD (Hard Disk Drive) and an SSD (Solid State Drive). The memory 1104 is, for example, at least either one of a ROM (Read Only Memory) and a RAM (Random Access Memory) and stores various types of data and programs which are required for processing of the CPU 1103.

The CPU 1103 has a carrier control function and controls movements of the carriers 102, 104 and 105 inside the parking place. This CPU 1103 controls transportation of the vehicle 103, which has newly arrived, to an empty parking space within the parking place by having these carriers 102, 104 and 105 retain the vehicle 103.

Next, an explanation will be given concerning an automatic parking management system for calculating an appropriate quantity of the carriers 102, 104 and 105 to be used to perform the work to park the vehicles 103 by means of the valet parking above.

(1-3) Simulation Example

Figure 4:
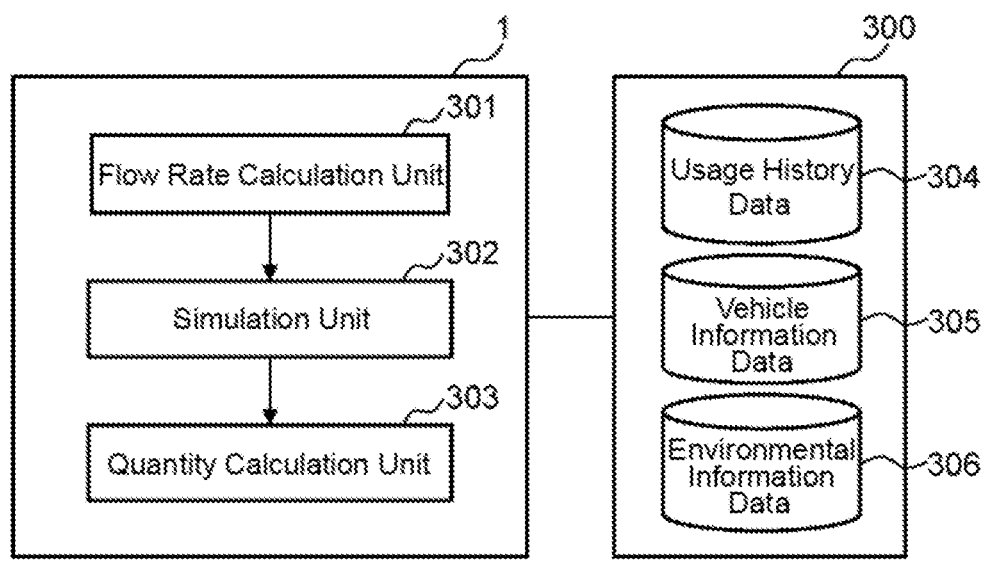
FIG. 4 is a block diagram illustrating a configuration example of a control simulator.

FIG. 4 illustrates a block diagram showing a configuration example of a control simulator 1. The control simulator 1 guides a virtual carrier to an empty parking space in a simulated manner before actually moving the carriers 102, 104 and 105 within the parking place by means of the carrier control function of the CPU 1103. This control simulator 1 is a simulator in the virtual space, which has a function calculating a transportation route for a virtual vehicle as described above according to a transportation logic similar to that of the control system 3 and realizes a transportation mode in a simulated manner in consideration of the physical status (size, weight, moving speeds, etc.) of the actual carriers 102, 104 and 105 and the vehicle 103.

The control simulator 1 includes a flow rate calculation unit 301, a simulation unit 302, and a quantity calculation unit 303 and is connected to a storage device 300. Note that the storage device 300 may be part of the control simulator 1.

The storage device 300 stores usage history data 304 concerning usage history of the parking place, vehicle information data 305 described later, and environmental information data 306 described later.

The quantity calculation unit 303 firstly has the control simulator 1 receive the usage history data 304 of the parking place. This usage history data 304 herein used is, for example, data indicative of a daily parking usage status and loading/unloading log data of the parking place, to which time information is added. Specifically speaking, this usage history data 304 records, for example, each piece of information concerning a time when loading or unloading is performed.

The flow rate calculation unit 301 converts such usage history data 304, for example, calculates the number of times of loading and unloading use at the parking place on a unit time basis, and acquires parking place usage information including the above information. This flow rate calculation unit 301 may calculate, for example, an average parking time as part of this parking place usage information instead of or in addition to the above-mentioned information.

After receiving the number of times of use and the parking time which are calculated by the flow rate calculation unit 301 as input values, the simulation unit 302 reads the vehicle information data 305 from the storage device 300, while it reads the environmental information data 306 from the storage device 300. The vehicle information data 305 herein used is, for example, data having information such as the lengths, heights, types, vehicle models, vehicle numbers, colors, and owners of vehicles as illustrated in FIG. 5 and explained below; and the control simulator 1 uses the size such as the length and the height as input values.

Figures 5, 6:
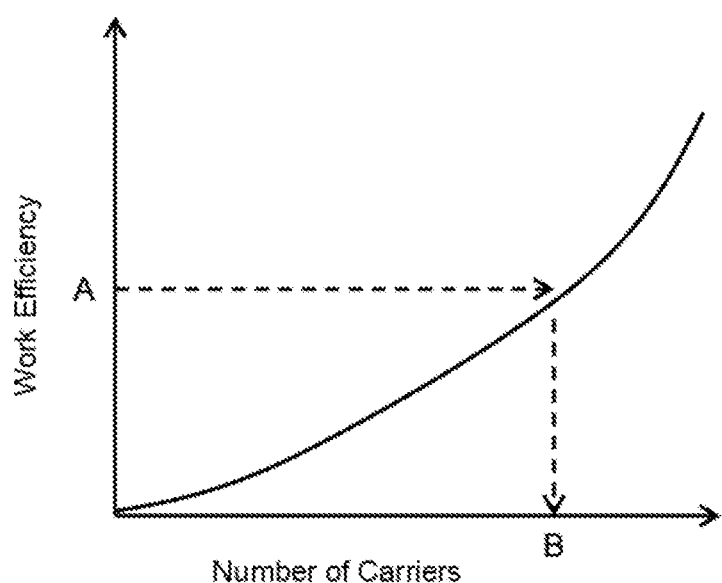
FIG. 5 is a vehicle information table including vehicle information data indicated in FIG. 4.
FIG. 6 is a diagram illustrating an example of simulation results showing the relationship between the quantity of carriers and work efficiency.

FIG. 5 is an example of a vehicle information table managed by the vehicle information data 305. The vehicle information table has, as its column names (columns), an ID 401, a vehicle length 402, a height 403, a vehicle type 404, a vehicle model 405, a vehicle number 406, a color 407, and an owner 408.

On the other hand, the environmental information data 306: relates to a layout of areas including the parking place although it is not specifically illustrated in drawings; and describes the size and arrangement of the parking space 101 illustrated in FIG. 1 and the size and arrangement of the getting-in/out space. The layout is managed, for example, on a map and expressed with the latitude, the longitude, or the XY-coordinate system.

The simulation unit 302 retains specification information concerning the carriers 102, 104 and 105 such as the quantity and speeds of the carriers 102, 104 and 105 to be used and battery capacity as internal parameters. The simulation unit 302 sets conditions to execute a simulation based on the vehicle information data 305 and the environmental information data 306, and the parking usage information received from the flow rate calculation unit 301.

The parking work status is created using transportation instructions for loading and unloading as input information based on the quantity of vehicles to be loaded or unloaded per unit time. The simulation unit 302 virtually causes the virtual carrier (not illustrated in the drawing) to perform the transportation work in the virtual space by issuing the instruction to the virtual carrier (not illustrated in the drawing) to designate a transportation route and a transportation position according to the created parking work status.

Meanwhile, the control system 3 above has: a function that optimally determines the position of the vehicle 103 to enhance parking efficiency according to the size of the vehicle 103 which is the target to be transported (parking position determination function); and a function that optimally sets the movement route to arrive at a destination (desired parking space) within the parking place in the shortest time based on the positions of other carriers and the work status. The simulation unit 302 above has almost the same function as that of the control system 3 in terms of optimization of the transportation route although there is a difference between an actually existing vehicle and a virtual vehicle.

The simulation result calculated by the simulation unit 302 represents, for example, work efficiency such as the number of times of transportation on a unit time basis. Alternatively, regarding this simulation result, a time required to enable unloading after accepting an unloading request may be regarded as the work efficiency instead of the number of times of transportation per a unit time.

The quantity calculation unit 303 receives the simulation result from the simulation unit 302. The quantity calculation unit 303 changes the quantity of the carriers 102, 104 and 105 to be used as the internal parameter of the simulation unit 302 based on the received simulation result and causes the simulation unit 302 to execute the simulation again.

The quantity calculation unit 303 receives the simulation result in a plurality of patterns by increasing or decreasing the quantity of the carriers 102, 104 and 105.

FIG. 6 is a graph illustrating an example of the simulation result of the simulation unit 302. The horizontal axis represents the quantity of the carriers 102, 104 and 105, while the vertical axis represents the work efficiency.

The quantity calculation unit 303 calculates the quantity of the carriers 102, 104 and 105 required to complete a desired vehicle transportation work based on the simulation result. According to this simulation result, the quantity B of the carriers 102, 104 and 105 required to reach predetermined work efficiency A can be estimated in consideration of the work efficiency of the transportation work.

According to the present embodiment described above, the required quantity of carriers B to reach the predetermined work efficiency A as illustrated in FIG. 6 can be calculated in accordance with the simulation result using the control simulator 1 for which the parking place work status is used as the input information. If the required quantity calculated above of the carriers 102, 104 and 105 is used to convert a cost per carrier into a total cost, the relationship to be found between the predetermined work efficiency A and the total cost can be obtained and a reasonable (valet parking) service corresponding to appropriate cost can be provided.

(2) Second Embodiment

An automatic parking management system according to a second embodiment has almost the same configuration and function as those of the automatic parking management system according to the first embodiment, so that the same reference numerals are used for the configuration and function similar to those of the first embodiment and an explanation concerning them has been omitted.

In the second embodiment, an explanation will be given concerning a case where the valet parking illustrated in the first embodiment is used, the required quantity of carriers B is used to maintain desired working capacity A as illustrated in FIG. 6, and the carriers 102, 104 and 105 are shared among a plurality of parking places.

Figure 7:
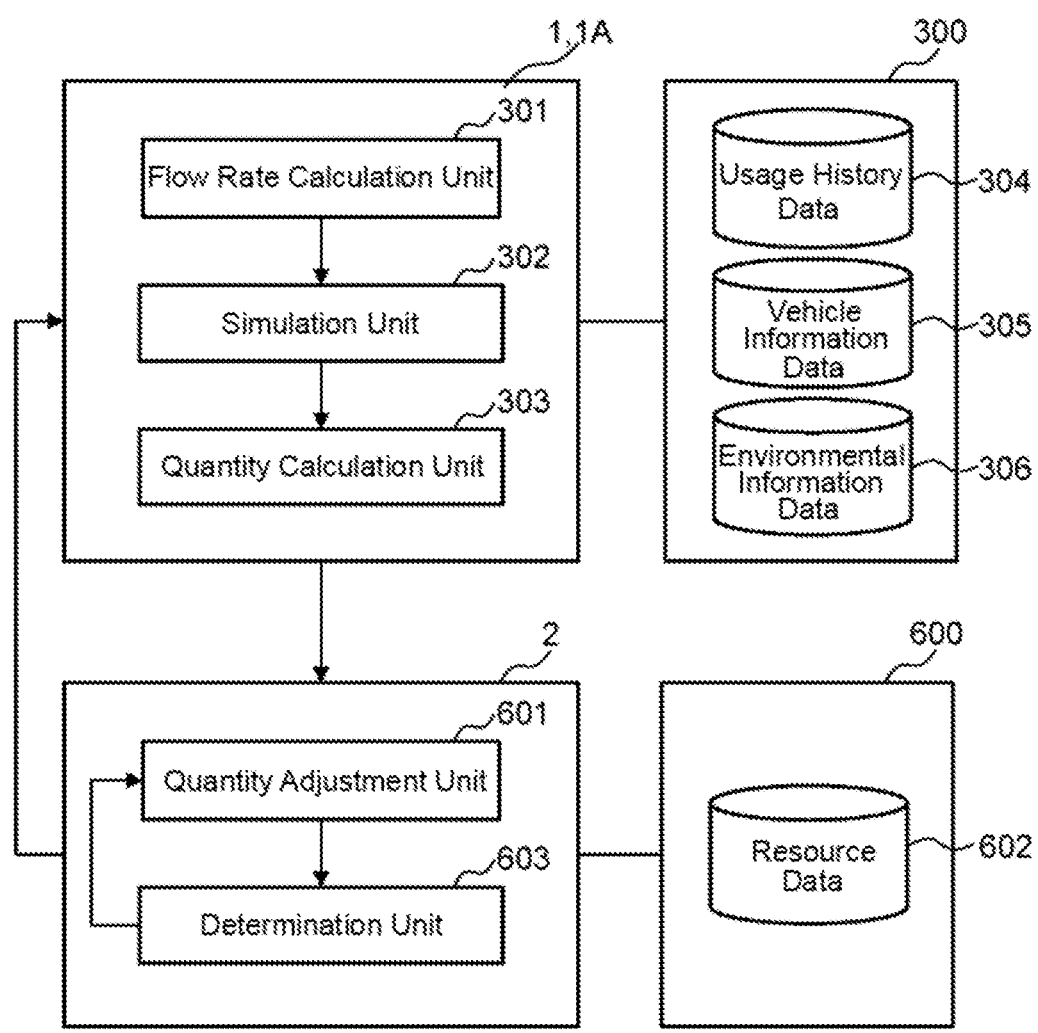
FIG. 7 is a block diagram illustrating a configuration example of an automatic parking management system according to a second embodiment.

(2-1) Configuration Example of Automatic Parking Management System According to Second Embodiment FIG. 7 is a block diagram illustrating a configuration example of the automatic parking management system according to the second embodiment. The automatic parking management system according to the second embodiment is newly provided with a resource management subsystem 2 and a storage device 600. The storage device 600 stores resource data 602. This storage device 600 may be part of the resource management subsystem 2.

After receiving the simulation result calculated by the control simulator 1, that is, information concerning the quantity B of the carriers 102, 104 and 105 required to maintain the working capacity A illustrated in FIG. 6, this resource management subsystem 2 refers to the resource data 602 of the storage device 600. A specific example of this usage history data is, for example, the status of a plurality of parking places expressed in a table format as illustrated in FIG. 8.

This usage history data includes, for example, the position of the parking place (which is expressed with the latitude, the longitude, or the XY coordinate system, or a city, town, or village name, etc.), the size of the parking place, a weekly or monthly average number of parked vehicles, the maximum number of parked vehicles which can be accommodated by the parking place, the quantity of the carriers 102, 104 and 105 (the quantity of carriers) in use, and a predicted value of the quantity of vehicles using the parking place in the future (tomorrow in the example illustrated in the drawing) which is calculated in advance based on the past usage history. Note that the future used here may be, for example, a predicted value of the quantity of vehicles using the parking place for the next week or the next month instead of tomorrow.

The resource management subsystem 2 changes assignment of the quantity of the carriers 102, 104 and 105 between the plurality of parking places in order to equalize the work efficiency at the plurality of parking places based on the information concerning the quantity of the carriers 102, 104 and 105 B received by the quantity adjustment unit 601 from the control simulator 1, and the resource data 602 of the storage device 600.

Figure 9A:
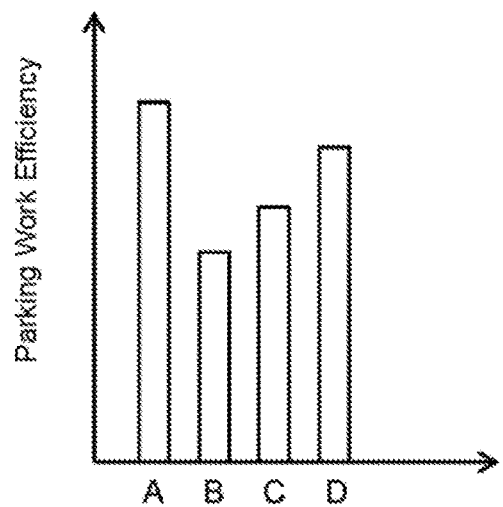
FIGS. 9A and 9B are diagrams illustrating an example of parking work efficiency at the plurality of parking places.
Figure 9B:
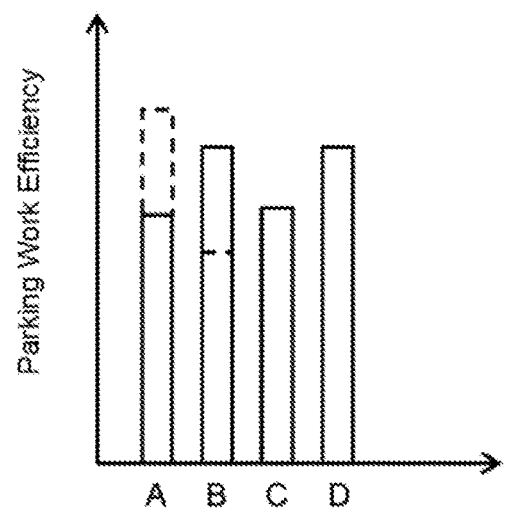

FIGS. 9A and 9B are respectively a diagram illustrating an example of the parking work efficiency at the plurality of parking places. The examples illustrated in these drawings show that the work efficiency at parking a place A is very high, while the work efficiency at a parking place B is low.

The quantity adjustment unit 601 issues a simulation request to the control simulator 1 in order to cause the control simulator 1 to perform a simulation on the condition of an increased quantity of carriers to enhance the work efficiency at the parking place B. After receiving such simulation request, the control simulator 1 receives the input of the above-mentioned condition of the increased quantity of carriers and calculates the work efficiency based on the increased quantity of carriers.

Note the work efficiency calculated above does not have to be calculated every time by the control simulator 1, however the relationship between the quantity of carriers at each parking place and the work efficiency may be found in advance and this relationship between the quantity of carriers at each parking place and the work efficiency, which is prepared in advance, may be used every time as required.

(2-2) Simulation Example if Carriers are Available Between Parking Places

At the parking place A with high work efficiency in FIGS. 9A and 9B, when asking whether the work efficiency would not decrease even if the quantity of carriers is decreased, the control simulator 1 simulates a case assuming that the quantity of carriers is decreased. For example, if it is found that the work efficiency would not decrease even when reducing the number of carriers by three at the parking place A, the control simulator 1 calculates the work efficiency of a case where three carriers are moved to another parking place (for example, parking place B).

The determination unit 603 determines how many carriers 102, 104 and 105 should be moved from which parking place to which parking place. This determination not only finds influence of an increase or decrease of the quantity of carriers on the work efficiency, but also focuses on a cost for moving the carriers 102, 104 and 105 to be increased or decreased. The determination unit 603 determines, for example, based on the quantity adjustment result by the quantity adjustment unit 601 that, for example, even if three carriers 102, 104 and 105 are moved from parking place A to parking place B, the work efficiency of parking place B can be enhanced without any decrease in the work efficiency of parking place A.

In this case, regarding whether to move the three carriers or not, the determination unit 603 calculates an approximate distance between the parking place A and parking place B based on the positional information including the latitude and the longitude of each parking place as illustrated in FIG. 8 and calculates the cost for moving these three carriers 102, 104 and 105.

This determination unit 603 compares this calculated cost with, for example, a cost obtained by enhancement of the work efficiency of parking place B; and, for example, when the cost obtained by the enhancement of the work efficiency of parking place B is higher, the determination unit 603 determines that the carriers 102, 104 and 105 which are currently located at the parking place A should be moved to parking place B. Under this circumstance, the cost obtained by the enhancement of the work efficiency at the parking place which is a movement destination (parking place B) may be, for example, a daily cost or an integrated cost on a weekly or monthly basis.

According to the present embodiment as described above, the carriers 102, 104 and 105 can be shared among the plurality of parking places by the control simulator 1, and the resource management subsystem 2 and the quantity of the carriers 102, 104 and 105 to be distributed can be determined in order to further enhance the work efficiency of all the parking places based on the resource data 602 of each parking place. As a result, the work administrator of each parking place does not have to retain the carriers 102, 104 and 105 which could be wasteful resources, and the efficiency of the transportation work at each parking place can be enhanced.

(3) Third Embodiment

An automatic parking management system according to a third embodiment has almost the same configuration and function as those of the automatic parking management systems according to the first and second embodiments, so that the same reference numerals are used for the configuration and function similar to those of the first and second embodiments and an explanation concerning them has been omitted.

The automatic parking management system according to the third embodiment has a fee calculation function which is not adopted by the automatic parking management systems according to the first and second embodiments, and is used when the parking place work administrator uses the valet parking service.

When the parking place work administrator introduces the automatic parking management system, normally the parking place work administrator pays for the entire system as an initial investment and the parking place work administrator or a system operator operates the system. Therefore, even when the initial investment increases substantially or the quality of vehicles using the parking place changes, the parking place work administrator cannot easily expand or downsize the system; and it appears that when an attempt is made to change the configuration of the system, there is a fear of resulting in an increase in the work cost and a failure to earn profits from the introduced system.

However, regarding the automatic parking management system according to the third embodiment, the parking place work administrator adopts a usage fee calculation subsystem which enables fee settings to make it possible to introduce the system only with a parking usage fee.

Figure 10:
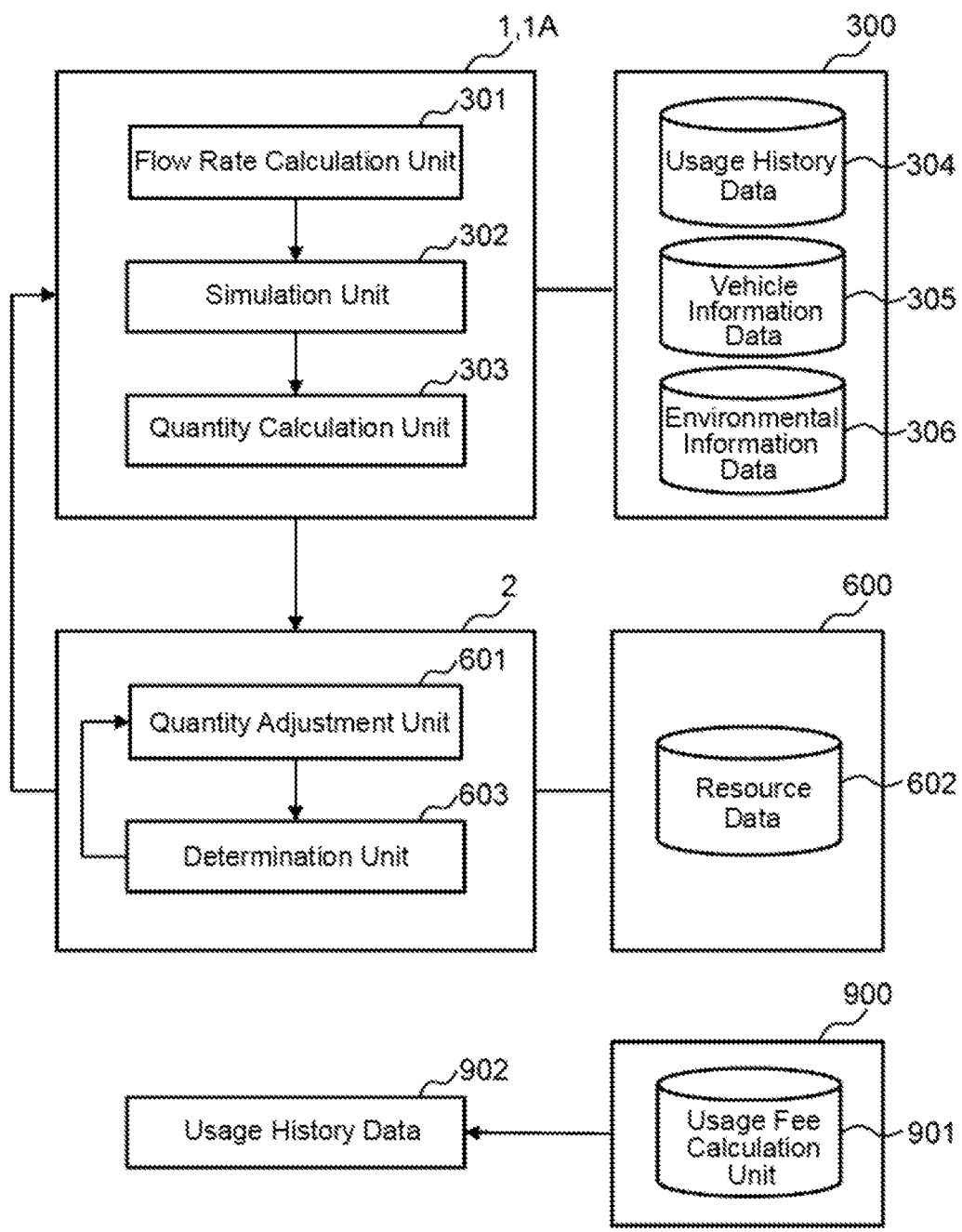
FIG. 10 is a block diagram illustrating a configuration example of part of an automatic parking management system according to a third embodiment.

FIG. 10 illustrates a configuration example of the usage fee calculation subsystem for calculating the usage fee.

In this usage fee calculation subsystem, a usage fee calculation unit 902 calculates the number of times of vehicle loading/unloading at the parking place during a certain set period based on vehicle loading/unloading log data accumulated as a usage history data 901 stored in a storage device 900.

Figure 11A:
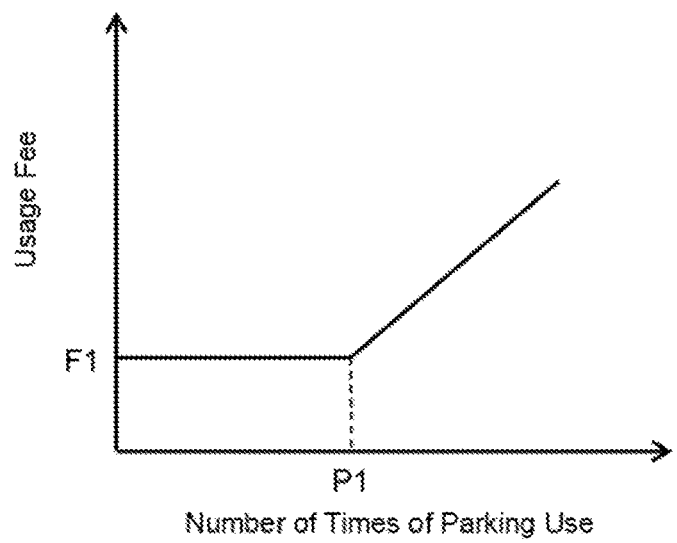
FIGS. 11A and 11B are diagrams illustrating an example of the relationship between a usage fee and the number of times of parking use.
Figure 11B:
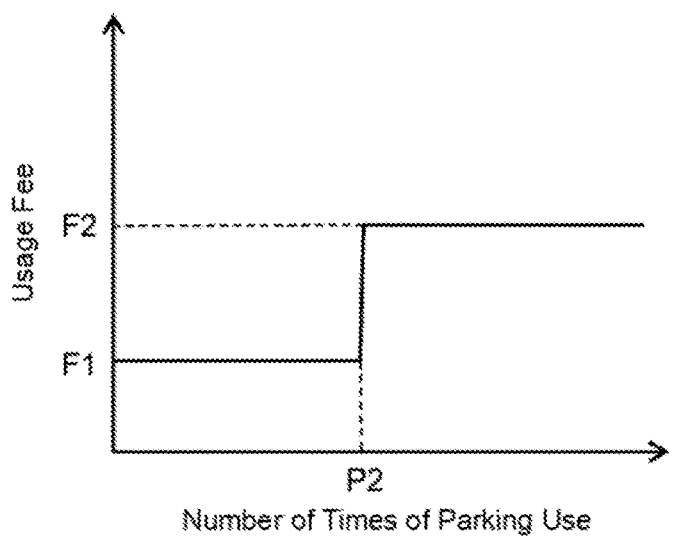
Figure 12:
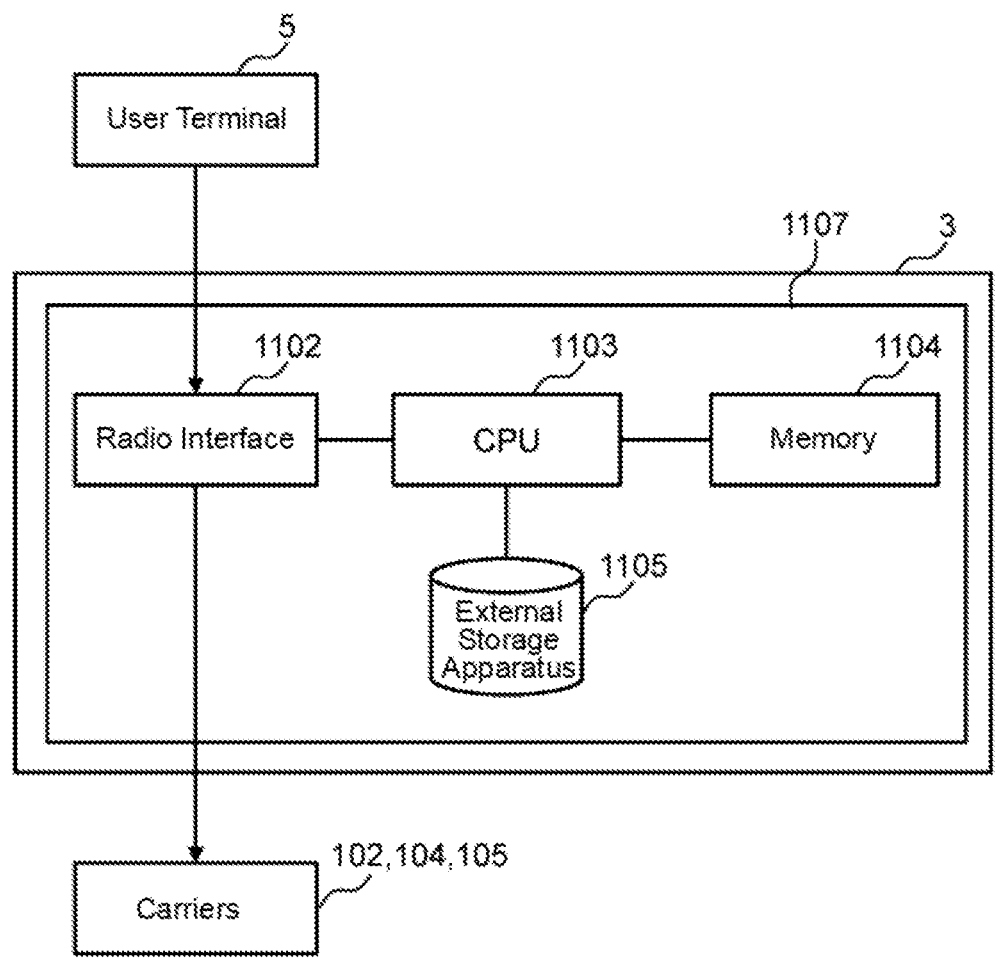
FIG. 12 is a block diagram illustrating a configuration example of a control system and a user terminal according to a fourth embodiment.

FIGS. 11A and 11B respectively illustrate an example of a relationship between the usage fee and the number of times of parking use. The examples illustrated in these drawings show that the usage fee is set according to the quantity of vehicles using the parking place. The number of times of vehicle loading and unloading which is calculated as described above corresponds to the number of times of parking use as indicated as the horizontal axis of FIGS. 11A and 11B and the usage fee corresponding to this number of times of parking use is derived as follows.

In the example illustrated in FIG. 11A, the usage fee for the number of times of parking use P1 or less is a usage fee F1 which is constant; however, when the number of times of parking use exceeds P1, the number of times of parking use starts increasing; and as the number of times of parking use further increases, the usage fee is obtained by adding a fee according to the increased amount to the usage fee F1.

Meanwhile, in the example illustrated in FIG. 11B, the usage fee for the number of times of parking use P1 or less is constant as indicated as a fixed-amount usage fee F1; however, when the number of times of parking use exceeds P2, the usage fee further becomes constant as indicated as a next fixed-amount usage fee F2.

Note that regarding FIGS. 11A and 11B, the usage fee may be set according to the quantity of the carriers 102, 104 and 105 to be used. The quantity of the carriers 102, 104 and 105 to be used is set by the parking place work administrator; and during a time period for which the setting is set, the work is conducted with the designated quantity of the carriers 102, 104 and 105.

According to the present embodiment as described above, the parking place work administrator can introduce the above-described automatic parking management system simply by holding down a substantial amount of an initial investment, which has been normally required to introduce the system, and paying only the usage fee for each use.

(4) Fourth Embodiment

An automatic parking management system according to a fourth embodiment has almost the same configurations and functions as those of the automatic parking management systems according to the first to third embodiments, so that the same reference numerals are used for the configurations and functions similar to those of the first to third embodiments and an explanation concerning them has been omitted.

The automatic parking management system according to the fourth embodiment adopts an unloading management function that is not adopted by the automatic parking management systems according to the first to third embodiments, and performs unloading of the vehicles 103 efficiently by using, for example, history information of users who use the parking system.

(4-1) Configuration of Unloading Management Function

Figures 13, 14:
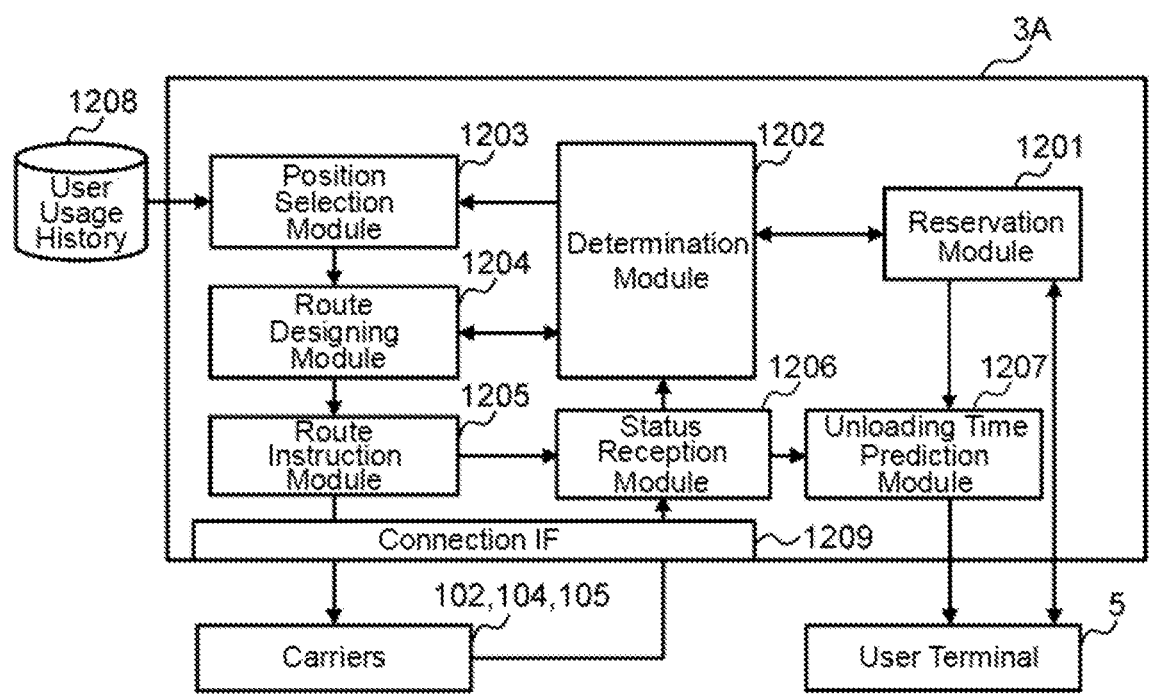
FIG. 13 is a block diagram illustrating a software configuration example of part of an automatic parking management system according to the fourth embodiment.
FIG. 14 is a diagram illustrating an example of a user information table for managing user information.

FIG. 13 illustrates a software configuration example of part of the automatic parking management system according to the fourth embodiment. In the fourth embodiment, the automatic parking management system includes a control system 3A which has almost the same configuration and function as those of the control system 3 according to the first embodiment; and a user terminal 5 is connected to the control system 3A via the radio interface 1102. This user terminal has, for example, a GPS (Global Positioning System) function, that is a function measuring a current position.

The control system 3A has a function that controls unloading of a target vehicle 103 based on reservation information received from the user terminal 5. This control system 3A includes a reservation module 1201, a determination module 1202, a position selection module 1203, a route designing module 1204, a route instruction module 1205, a status reception module 1206, an unloading time prediction module 1207, and a connection interface 1209. This connection interface 1209 is an interface between each module of the control system 3A and an external apparatus.

The reservation module 1201 receives reservation information including a user ID, reservation time, positional information indicative of the present position, and entryexit information, from the user terminal 5, and transmits the reservation information to the determination module 1202. The determination module 1202 determines a car stop position based on the reservation information, and transmits it to the reservation module 1201. The reservation module 1201 transmits detailed information including the car stop position as a response to the user terminal 5 via a radio interface which is not illustrated in the drawing (corresponding to the radio interface 1102 above).

Each user above is managed by means of a user information table illustrated in FIG. 14. This user information table manages user information and includes, as column names (columns), a user ID 1301, an age 1302, and a sex 1303. The user ID 1301 is information for identifying each user within the automatic parking management system and is uniquely determined for each user. The age 1302 represents an age when each user was born. The sex 1303 represents each user's gender.

The reservation time above is information input by the user from the user terminal 5 and is information indicating, for example, whether it is a reservation for parking (parking reservation) or a reservation for unloading (unloading reservation). The positional information is positioning information measured by a GPS (Global Positioning System) which is built in the user terminal 5.

Note that even when the input information above is not input by the user, the input information may be automatically determined, and input by the reservation module 1201 based on, for example, the positional information. For example, if the position according to the positional information is located 10 km or more away from the parking place and the reservation is made for today, it may be determined that the relevant reservation is the parking reservation. If there is a parking reservation of the same user immediately before the relevant reservation, it may be determined that the relevant reservation is the unloading reservation.

The position selection module 1203 receives reservation acceptance information from the determination module 1202 and determines which parking space should be selected from among empty parking spaces in the parking place which is the target to be managed.

The position selection module 1203 refers to user usage history 1208. The user usage history 1208 is record information including, as column names (columns), for example, a user ID 1401, a vehicle number 1402 to be used, a past visit date 1403, an arrival time 1404, a departure time 1405, and purchase history 1406 as illustrated in FIG. 15.

The position selection module 1203 calculates an average time for the user to stay at a facility where the parking place is built together. Note that the position selection module 1203 may calculate an average time, for example, for each day of the week or on a monthly basis instead of the average time above. This position selection module 1203 determines to locate, for example, a vehicle 103 of a user whose stay time tends to become long such as several hours, to a place far from an entrance/exit of the parking place based on the average time calculated above, meanwhile, the position selection module 1203 determines to locate a vehicle 103 of a user 103 whose stay time tends to become short, near the entrance/exit of the parking place.

Additionally, the position selection module 1203 may determine the parking position of the vehicle 103 by applying a pattern to locate vehicles highly densely in order to enhance the parking efficiency of the parking place based on the sizes of the vehicles 103. As an example of such case, for example, the largest number of vehicles 103 can be parked in terms of a layout of the parking place by combining a large vehicle 103 with a small vehicle 103.

The route designing module 1204 designs a route for the carrier 102 to move to a position determined by the position selection module 1203 in the shortest time. When other carriers 104 and 105 are moving or performing the parking work along the route, it is predicted that it will take longer to pass along the route above. Thus, a long transit time is estimated for a route to pass through the relevant route. The positions of the other carriers 104 and 105 are determined based on the position of the carrier 102 which each carrier 102, 104 and 105 notifies the control system 3 of.

The route instruction module 1205 issues an instruction to the carrier 102 to designate the route designed by the route designing module 1204. The carrier 102 performs the work to load the vehicle 103 in accordance with the route received from the route instruction module 1205 and an work instruction at each point.

The status reception module 1206 receives status notification from the carrier 102. The status herein used means information such as positional information (which is described with the latitude, the longitude, or the XY coordinate system) of the carrier 102 and information indicating during elevation operation or charging operation.

The unloading time prediction module 1207 receives information of the unloading reservation from the reservation module 1201 and calculates a time required for the target vehicle to arrive at the getting-in area. This unloading time prediction module 1207 calculates the work status of each carrier 102, 104 and 105 from the position and work status of each carrier 102, 104 and 105 received from the status reception module 1206, while it calculates a congestion position(s) within the parking place, and predicts a time to move to a specified position.

The control simulator 1 may calculate a time to move a desired vehicle 103 by means of simulation using the information of each carrier 102, 104 and 105 received from the status reception module 1206 as input.

The unloading time prediction module 1207 informs the user terminal 5 of the predicted time until unloading.

Note that the control system 3 has the connection interface 1209 capable of communicating with the carriers 102, 104 and 105; and when the connection interface 1209 receives a signal from the carrier 104, it registers the IDs of the carriers 102, 104 and 105 in the control system 3 and the carriers 102, 104 and 105 can operate in accordance with instructions from the control system 3. The connection interface 1209 enables the carriers 102, 104 and 105 to easily come under the control of the control system 3 even if the number of the carriers 102, 104 and 105 is increased or decreased.

Since the user can recognize a time required to unload a vehicle after making an unloading reservation, the user can effectively make use of a waiting time even if the waiting time before unloading the vehicle is long.

Furthermore, the unloading time may be predicted from the user's parking usage history and the relevant vehicle may be moved to the getting-in space in advance.

Additionally, an unloading time of each vehicle 103 may be predicted from the user's usage history and the positions of the vehicles 103 within the parking place may be switched according to the predicted unloading time. In this case, if the predicted unloading time is close, the relevant vehicle is moved to a position near the parking place entrance/exit. As a result, when the unloading reservation is made, the vehicle 103 can be immediately moved to the getting-in space and the service of higher quality can be provided to the user.

Contrarily, if the predicted unloading time is long, the vehicle may be moved to a parking space away from the parking place entrance/exit or to a position where vehicles 103 are located close to each other. As a result, it may be difficult to take out the relevant vehicle 103, but the parking efficiency of the parking place can be enhanced.

The present embodiment has described above, however the present embodiment is not limited to the example above and includes various variations. For example, the embodiment above has been described in detail in order to explain the invention in an easily comprehensible manner and is not necessarily limited to that having all the configurations explained above. Furthermore, part of the configuration of a certain embodiment can be replaced with the configuration of another embodiment and the configuration of another embodiment can be added to the configuration of a certain embodiment. Also, the configuration of another configuration can be added to, or deleted from, or replaced with, part of the configuration of each embodiment.

Moreover, part of the configuration of each embodiment can be added to, or deleted from, or replaced with, the configuration of another configuration. Furthermore, each of the aforementioned configurations, functions, processing units, and processing means may be implemented by hardware, for example, by designing part or all of such configurations, functions, processing units, and processing means by using integrated circuits or the like.

Additionally, each of the aforementioned configurations, functions, etc. may be implemented by software by having a processor interpret and execute a program for implementing each function.

Information such as programs, tables, and files for implementing each function can be stored in a memory, a storage apparatus such as a hard drive or an SSD (Solid State Drive), or a storage medium such as an IC (Integrated Circuit) card, an SD card, or a DVD (Digital Versatile Disc).

Additionally, control lines and information lines which are considered to be necessary for the explanation are illustrated; however, not all control lines or information lines are necessarily indicated in terms of products. Practically, it may be assumed that almost all components are connected to each other.

INDUSTRIAL APPLICABILITY

The present invention can be applied to a wide variety of automatic parking management systems and automatic parking management methods for a largescale parking place built on the premise of a large-scale facility such as a largescale commercial facility or a large-scale amusement facility.

REFERENCE SIGNS LIST

1 and 1A: Control simulator
2: Resource management system
3: Control system
102, 104 and 105: Carriers
103: Vehicle
106 and 107: Passengers

The invention claimed is:

1. An automatic parking management system for parking a vehicle in any empty parking space of a plurality of parking spaces at a parking place, the automatic parking management system comprising:
   carriers capable of retaining newly-arrived vehicles and transporting one of the vehicles to the empty parking space;
   a data storage device;
   a control simulator that conducts a simulation, during which the control simulator (a) receives, from the data storage device, usage history data of the parking place, (b) converts the usage history data received into a unit time loading and unloading frequency, (c) reads, from the storage device, vehicle length and height information and parking space size and arrangement information, (d) sets simulation execution conditions based on the vehicle length and height information, the parking space size and arrangement information, and the unit time loading and unloading frequency, (e) causes a selected number of virtual carriers to perform transportation of the vehicle in a virtual space based on the simulation execution conditions, and (f) adjusts the selected number of virtual carriers to evaluate relative parking work efficiencies and identify an optimum quantity of the carriers; and
   a control server including a memory, a central processing unit, and a radio interface to communicate with the carriers and perform parking work with the optimum quantity of said carriers.

2. The automatic parking management system according to claim 1, wherein the control simulator is configured to calculate the quantity of virtual carriers required to complete a desired vehicle transportation work.

3. The automatic parking management system according to claim 1, wherein the control simulator calculates a work efficiency when one of the virtual carriers is flexibly supplied among the plurality of parking places.

* * * * *